(12) United States Patent
Ringot

(10) Patent No.: US 6,538,635 B1
(45) Date of Patent: Mar. 25, 2003

(54) ELECTRONIC APPARATUS COMPRISING A DISPLAY SCREEN, AND METHOD OF DISPLAYING GRAPHICS

(75) Inventor: Nicolas Ringot, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/270,444

(22) Filed: Mar. 16, 1999

(30) Foreign Application Priority Data

Mar. 20, 1998 (FR) .............................. 98 03466

(51) Int. Cl.⁷ .................................................. G09S 5/00
(52) U.S. Cl. ........................................ 345/156; 345/683
(58) Field of Search ................................ 345/126, 348, 345/352, 349, 350, 351, 146, 902, 683, 685; 178/18.01, 19.01

(56) References Cited

U.S. PATENT DOCUMENTS

| 5,436,954 A | * | 7/1995 | Nishiyama et al. | ............ 379/58 |
| 5,706,448 A | | 1/1998 | Blades | ........................ 395/326 |
| 5,790,820 A | * | 8/1998 | Vayda et al. | ................. 345/834 |
| 5,886,697 A | * | 3/1999 | Naughton et al. | ........... 345/473 |
| 5,898,435 A | * | 4/1999 | Nagahara et al. | ............ 345/841 |
| 5,943,039 A | * | 8/1999 | Anderson et al. | ............ 345/810 |
| 5,966,671 A | * | 10/1999 | Mitchell et al. | ............. 455/575 |
| 5,986,638 A | * | 11/1999 | Cheng | ......................... 345/184 |
| 6,211,921 B1 | * | 4/2001 | Cherian et al. | .............. 345/856 |

FOREIGN PATENT DOCUMENTS

EP 0767418 A1 4/1997 ........... G06F/3/033

OTHER PUBLICATIONS

By IBM Technical Disclosure Bulletin, "Dynamic, Scrollable, Area–Sensitive Container Icons", vol. 35, No. 7, Dec. 1, 1992, pp. 474–475.

* cited by examiner

Primary Examiner—Vijay Shankar
Assistant Examiner—Nitin Patel
(74) Attorney, Agent, or Firm—Dicran Halajian

(57) ABSTRACT

An electronic apparatus includes a screen configured to display a desired portion of a icons. A controller rotationally moves of icons along a fictitious ring so that the desired portion of the icons are displayed on the screen.

16 Claims, 2 Drawing Sheets

ELECTRONIC APPARATUS COMPRISING A DISPLAY SCREEN, AND METHOD OF DISPLAYING GRAPHICS

FIELD OF THE INVENTION

The invention relates to an electronic apparatus comprising:

a screen on which a plurality of graphics must be displayed, movement means for moving said graphics.

The invention also relates to a method of displaying graphics, used in such an apparatus.

BACKGROUND OF THE INVENTION

Such apparatuses are well known and are widely used, notably in the field of portable telephones.

A problem which occurs in such apparatuses is that they have a small screen while there is a necessity for increasingly larger ones because the menus are enriched with items or icons.

SUMMARY OF THE INVENTION

It is an object of the present invention to provide an apparatus of the type described in the opening paragraph in which means are provided for facilitating the perception of these icons that may be displayed.

To this end, such an apparatus is characterized in that the movement means are constituted by means for rotating the graphics to be visualized.

The invention is based on the recognition that the different graphics are placed in a ring so that one maximally benefits from the always reduced surface of the screens. These graphics are then presented in an offset manner, which allows a better visualization on a small screen while giving the user the illusion that these graphics are well separated from each other.

These and other aspects of the invention are apparent from and will be elucidated, by way of non-limitative example, with reference to the embodiments described hereinafter.

DETAILED DESCRIPTION OF THE INVENTION

Figure 1:
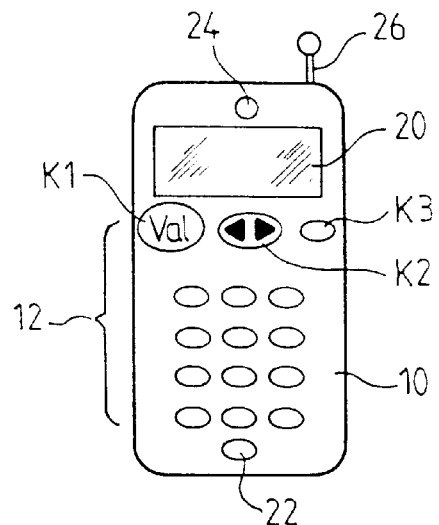
FIG. 1 shows an apparatus in accordance with the invention.

FIG. 1 shows an electronic apparatus in accordance with the invention. Within the embodiment described, this is a portable telephone which can be connected to a cellular network. It consists of a housing 10 in which different elements are arranged. These include a keyboard 12 having different keys K1, K2, K3, . . . , a display screen 20, a microphone 22, a receiver or loudspeaker 24 and an antenna 26.

Figure 2:
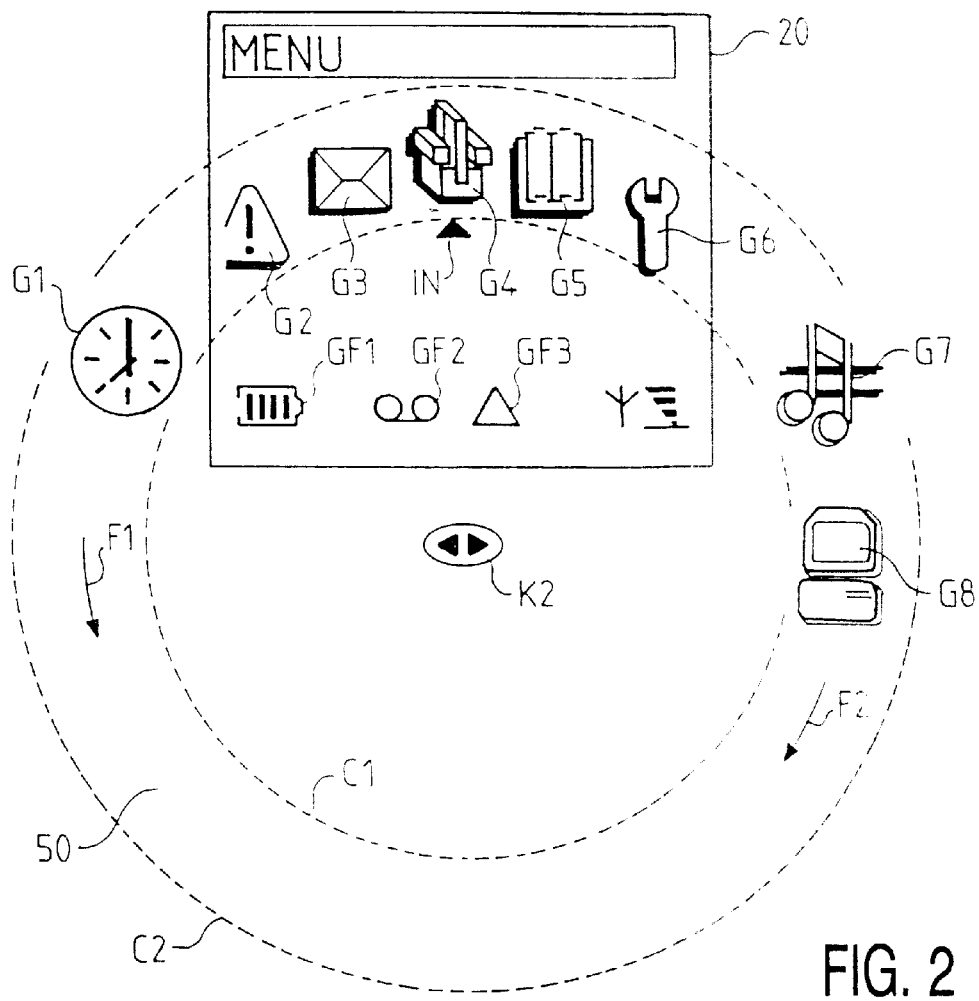
FIG. 2 shows how the graphics are displayed in accordance with the invention.

FIG. 2 shows the screen 20 with different movable graphics or icons G1, G2, G3, G4, G5, G6, G7, G8, . . . which can be displayed in the screen while using the movement control constituted by the key K2, and with other graphics GF1, GF2, GF3, . . . which are fixed. Among these fixed graphics, the index IN can be distinguished with which they can be activated, coincident with the movable graphics, by pressing the key K1 (FIG. 1).

According to the invention, the different movable graphics change position in a fictitious or virtual manner in a ring 50 comprised between two circles C1 and C2. According as one of the right-hand or left-hand parts of the key K2 is touched, the graphics rotate in the direction of the arrow F1 for the left-hand part and in the direction of the arrow F2 for the right-hand part.

Figure 3:
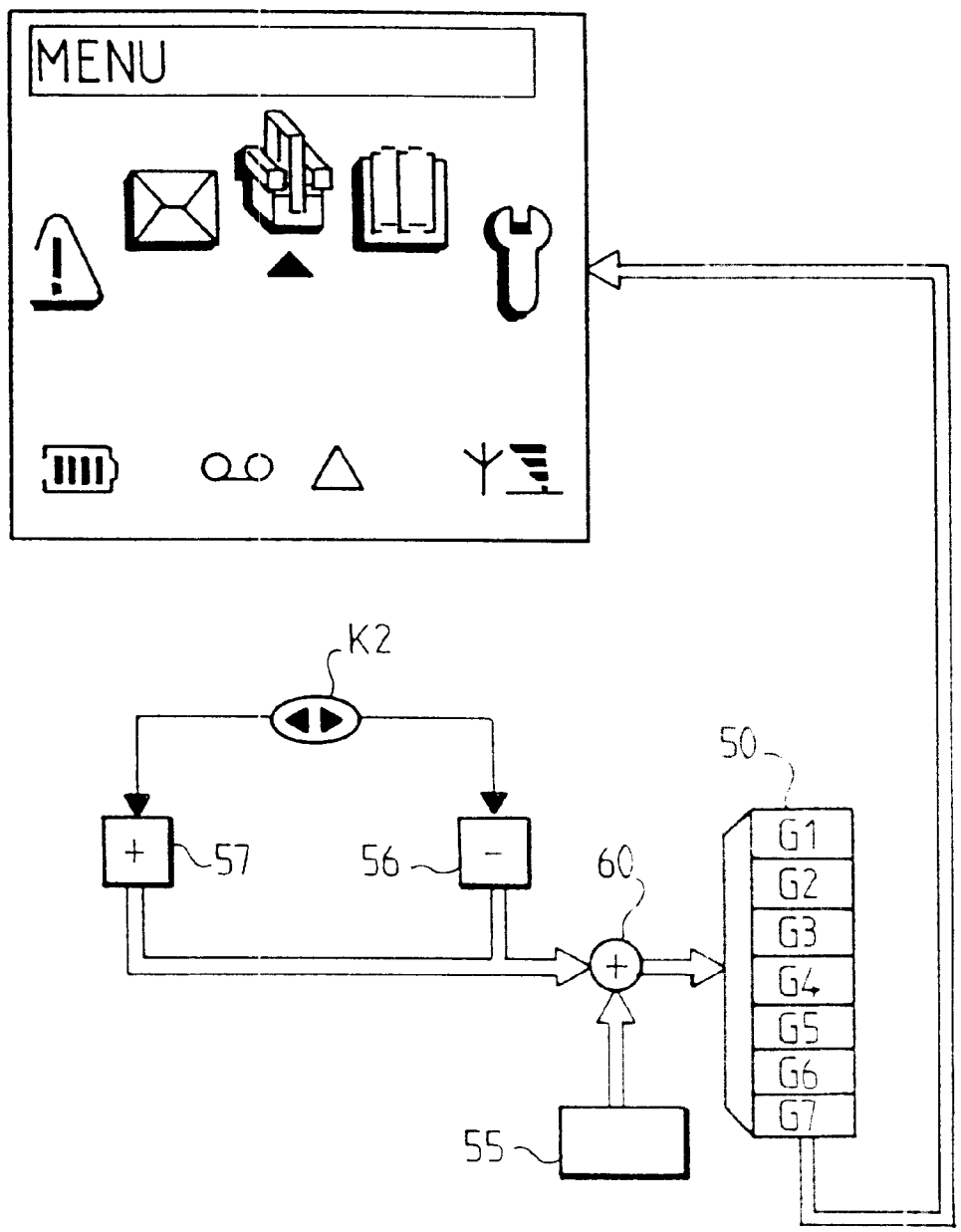
FIG. 3 shows an embodiment of the invention.

FIG. 3 shows an embodiment of the invention. The circuit shown in this Figure is constituted by a memory 50 comprising the data for all the movable graphics which may be displayed on the screen 20. Each of these graphics occupies the same number of octets in this memory and their addressing is thus separated by a fixed addressing quantity with respect to, the preceding and the following quantity. This addressing is ensured by an address code generator 55 which can supply the information about five graphics, which corresponds to what the screen 20 can display. This addressing may be modified by touching the key K2. If one touches the left-hand part, the addressing of said addressing quantity is reduced, and if one touches the right-hand part, the addressing of the same quantity is increased. This is effected by the incrementation circuit 56 and the decrementation circuit 57, respectively. The values supplied by these circuits 56 and 57 are accumulated in an accumulator adder 60 which finally addresses the memory 50 combining these values with those supplied by the generator 55. The data from the memory are thus supplied in sequences of 5 graphics to the screen 20. A screen control arranges these sequences in fixed positions in their order of appearance.

What is claimed is:

1. An electronic apparatus comprising:

a screen for displaying a plurality of graphics, movement means for moving said plurality of graphics, said movement means being constituted by means for rotating the plurality of graphics, and a hardware key which controls said means for rotation to effectuate rotating said plurality of graphics.

2. An electronic apparatus as claimed in claim 1, wherein the screen shows a part of the plurality of graphics placed in a fictitious ring.

3. An electronic apparatus as claimed in claim 1, wherein the screen has an index with which each graphic symbol of said plurality of graphics can be caused to coincide.

4. An electronic apparatus as claimed in claim 3, wherein said hardware key activates the graphic symbol caused to coincide with said index.

5. A method of displaying graphics, used in an apparatus provided with a screen comprising:

arranging the graphics in a fictitious ring, assigning a number of the graphics to be visualized at the same time, displaying said number of the graphics on said screen, and rotating the graphics at the request of a user so as to cause a portion of the graphics desired by the user to appear.

6. A method of displaying graphics as claimed in claim 5, further comprising:

causing a graphic symbol of said graphics to coincide with a fixed index placed on the screen, and validating said graphic symbol by touching a hardware key.

7. An electronic apparatus comprising:
a screen configured to display a desired portion of a plurality of graphics; and
a controller configured to perform a rotational movement of said plurality of graphics along a fictitious ring so that said desired portion of said plurality of graphics is displayed on said screen, wherein said controller is configured to assign a number of said plurality of graphics to be included in said desired portion for simultaneously displaying on said screen said number of said plurality of graphics.

8. The electronic apparatus of claim 7, wherein said screen includes an index with which each of said plurality of graphics can coincide in response to said rotationally movement.

9. The electronic apparatus of claim 8, further comprising a key for activating one of said plurality of graphics that coincides with said index.

10. The electronic apparatus of claim 7, wherein said controller performs said rotational movement in response to a user input.

11. The electronic apparatus of claim 10, wherein said user input includes operation of a key of said electronic apparatus.

12. A method for selecting an icon from a plurality of icons comprising:
arranging said plurality of icons in a fictitious ring;
displaying a desired portion of said plurality of icons;
rotationally moving said plurality of icons along said fictitious ring so that said desired portion of said plurality of icons are displayed on said screen; and
assigning a number of said plurality of icons to be included in said desired portion for simultaneously displaying on said screen said number of said plurality of graphics.

13. The method of claim 12, wherein said rotationally moving act includes placing one of said plurality of icons at a location that coincides with an index of said screen.

14. The method of claim 13, further comprising activating a key to activate said one of said plurality of graphics that coincides with said index.

15. The method of claim 12, further comprising activating a key to activate one of said plurality of graphics that coincides with an index of said screen.

16. The method of claim 12, further comprising activating a key to activate said rotationally moving act.

* * * * *